United States Patent Office 3,532,724
Patented Oct. 6, 1970

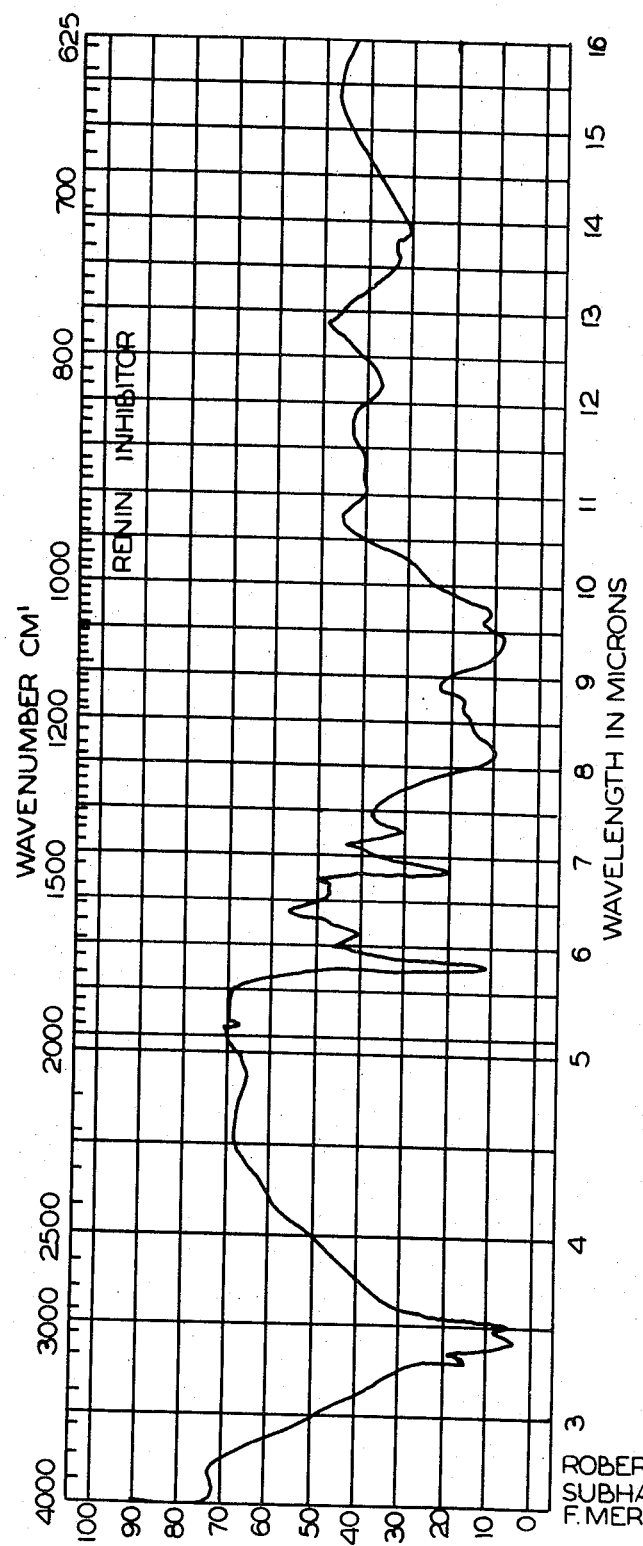

3,532,724
RENIN INHIBITOR AND PROCESS TO MAKE SAME
Robert R. Smeby, 36801 Riviera Road, Willoughby, Ohio 44094; Subha Sen, 15936 Euclid Ave., Cleveland, Ohio 44112; and Francis Merlin Bumpus, 80 Sterncrest Drive, Chagrin Falls, Ohio 44024
Filed May 31, 1967, Ser. No. 642,528
Int. Cl. C09k 1/34, 1/36
U.S. Cl. 260—403
4 Claims

ABSTRACT OF THE DISCLOSURE

There is disclosed herein an inhibitor of renin prepared from mammalian kidney tissue, characterized by possessing the infrared spectrum shown in FIG. 1 and the phospholipid structure $$R^1C(:O)OCH_2\text{---}CH(OC(:O)R^2)\text{---}CH_2\text{---}$$
$$OP(:O)(OH)\text{---}OCHR^3\text{---}CH(NH_2)\text{---}COOH$$

in which $R^1$ and $R^2$ represent the hydrocarbon chains of fatty acids containing from 16–20 carbon atoms and from 0–4 double bonds, and $R^3$ represents the hydrocarbon radical of a hydroxyamino acid different from serine, threonine or homoserine containing from 4–10 carbon atoms. The renin inhibitor is useful in the control of blood pressure in hypertension, and methods for its preparation and use are also given.

---

The invention described herein was made in the course of, or under, a grant from the U.S. Public Health Service, Department of Health, Education, and Welfare.

The present invention relates to a renin inhibitor and to a process for preparing same, as well as to pharmaceutical preparations containing said renin inhibitor. The renin inhibitor of this invention may be represented by the formula:

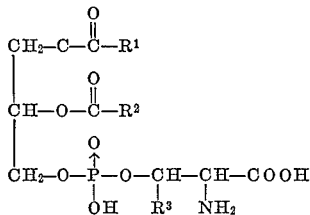

in which $R^1$ and $R^2$ represent the hdrocarbon radicals of fatty acids containing from 16–20 carbon atoms and from 0–4 double bonds, and $R^3$ represents the hydrocarbon radical of a hydroxyamino acid different from serine, threonine, and homoserine, said radical contaaining from 4–10 carbon atoms.

Renin, an enzyme released from kidney, reacts with an α-2-globulin in plasma (renin substrate) to release a decapeptide, angiotensin I. Converting enzyme, also present in plasma, rapidly splits histidyl-leucine from the C-terminal end of angiotensin I to yield an octapeptide, angiotensin II. This latter compound is the most potent natural pressor substance known. Both peptides are rapidly degraded by peptidases named angiotensinases. The reninangiotensin system, recently reviewed by Peart in Pharm. Rev. 17, 143 (1965) and Page and Bumpus in Physiol. Rev. 41, 331 (1961) appears to play an important role in the regulation of normal blood pressure, salt metabolism, and some types of experimental and clinical hypertension.

The renin inhibitor of this invention, in inhibiting an essential element of the above system, is useful in the control of blood pressure in hypertension and has the advantage of being ineffective in normotensive subjects. It may be formulated with pharmaceutically acceptable vehicles such as, for example, physiological saline, in the form of suspensions for injection containing from 0.5 to 25 mg./ml. of the active ingredient. Such preparations for injection may be administered, preferably by intramuscular injection, in doses containing from 0.1–10 mg./kg. over periods of time of from 2–4 days, when return to normal blood pressure levels will usually be observed. The renin inhibitor of this invention may also be formulated with suitable excipients such as, for example, starch, lactose, magnesium stearate, or magnesium silicate, in the form of tablets or capsules containing from 50–250 mg. of the active ingredient each, and may be administered orally in divided doses as required to control blood pressure levels.

The renin inhibitor of this invention is present in mammalian kidney tissue, and we prefer to use hog kidneys as the starting material for its preparation. More specifically, in a preferred procedure, ground hog kidney is extracted with approximately 2.5 parts (w./v.) of acetone, washed twice with approximately one part of acetone, combining the acetone extracts and washings and evaporating them under reduced pressure. It should be noted at this point that the renin inhibitor of this invention is present in its natural state in the kidney tissue in a non-dialyzeable form, probably bound to protein. Acetone extraction obviously breaks the bond between the renin inhibitor of this invention and the protein, because the renin inhibitor is dialyzeable after having been extracted from kidney tissue with acetone.

The acetone-extracted kidney tissue is discarded, and the dry residue from the acetone extraction step (1 part) is dissolved in approximately 7.5 parts of chloroformmethanol mixture 2:1, filtered, the filtrate evaporated to dryness under reduced pressure and redissolved in the same amount of chloroform-methanol mixture 2:1 and then washed five times with 0.2 volume of water each. The aqueous washings are discarded, and the organic phase is evaporated to dryness under reduced pressure. The residue is dissolved in a minimum of petroleum ether (B.P. 30–60° C.), and ten volumes of acetone are added. The mixture is kept at −20° C. to −30° C., preferably at −24° C., for 24 hours, and is then centrifuged. The supernatant is discarded, and the precipitate is washed three times with acetone, to yield a crude lipid fraction.

The crude lipid fraction obtained above is dissolved in a minimum of chloroform-methanol mixture 4:1 and is chromatographed on a column of silicic acid prepared with the same solvent mixture and containing about 55 parts (w./w.) of silicic acid per part of crude lipid. The chromatogram is developed with about 10 parts (v./w.) of chloroform-methanol mixture 4:1, thus eluting substantially all of the renin inhibitor. Continued elution of the above silicic acid column with successive portions of chloroform-methanol mixtures 3:1, 3:2, and 1:4 yields a lecithin fraction and other phospholipids which are inactive as renin inhibitors.

The eluates obtained above with chloroform-methanol mixtures 4:1 contain not only the desired renin inhibitor, but also phosphatidyl serine, phosphatidyl ethanolamine, and probably also neutral lipids. They are evaporated under nitrogen and under reduced pressure, the resulting lipid fraction is dissolved in a minimum of chloroformmethanol mixture 6:1 and is chromatographed again on a column containing about 150 parts of silicic acid per part of lipid fraction. This second column of silicic acid is eluted first with chloroform-methanol mixture 6:1 to remove inactive materials, mainly phosphatidyl serine, phosphadityl ethanolamine, and neutral lipids, and then with ethyl acetate-methanol mixture 3:2. This last eluate contains substantially all of the renin inhibitor of this invention available from the starting material.

If the above renin inhibitor fraction should still contain some phosphatidyl serine it may be purified further by chromatography on a third column of silicic acid prepared in chloroform-methanol 4:1 containing 10 ml. concentrated aqueous ammonia solution per liter. Elution of this last-named silicic acid column with chloroform-methanol mixture 4:1 yields the renin inhibitor of this invention. The process may be represented by the following scheme.

to 1.5–2 ml. per minute. After the silicic acid has reached a constant level, the solvent is allowed to flow until it reaches the surface of the silicic acid forming a packed column of 3 x 40 cm. The phospholipid obtained above (1.35 g.) is dissolved in a small volume of the same chloroform-methanol mixture and pipetted into the column. One gram of silicic acid is used for each 0.8 mg. of phos-

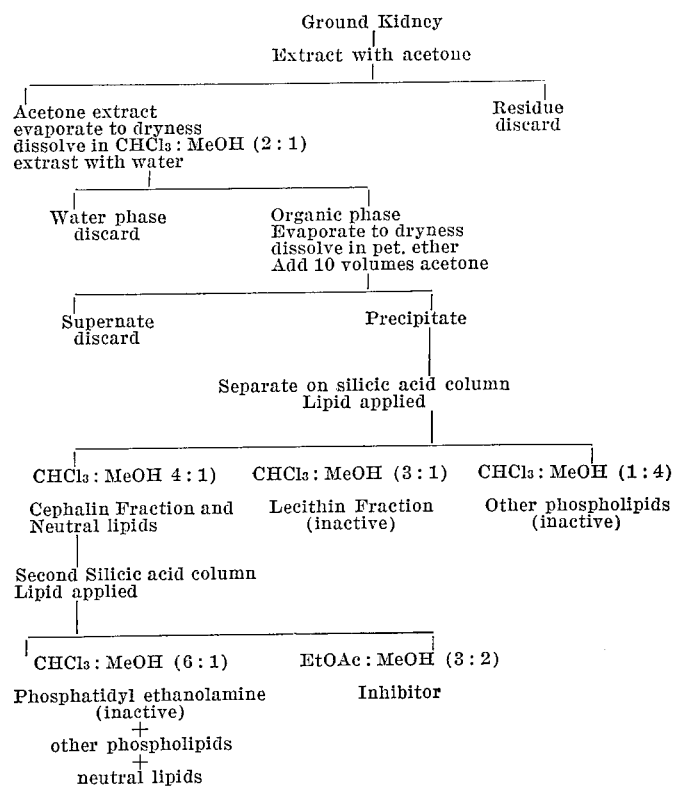

During the course of the above process it is convenient to estimate the purity of the various fractions obtained by thin-layer chromatography, using silica gel plates and developing with mixtures of chloroform-methanol-water in various proportions, or n - butanol - pyridine-water 60:40:20, or chloroform - methanol - diisobutyl ketone-acetic acid-water 23:10:45:25:4. The following example will illustrate our invention:

EXAMPLE 1

The acetone extract of 3,592 g. of kidney, prepared by extracting with 8.75, 3.5 and 3.5 liters of acetone, is evaporated to dryness under reduced pressure. The residue (135 g.) is extracted with liter of chloroform-methanal mixture (2:1), filtered and evaporated to dryness. It is dissolved in 1 liter of chloroform-methanol (2:1) and the solution is washed 5 times with ⅕ this volume of distilled water at 4°. The orgnic phase is then taken to dryness under reduced pressure. The residue (63.7 g.) is dissolved in a minimum of petroleum ether (B.P. 30–60°) and 10 volumes of acetone are added. After 24 hours at −24°, the precipitate is removed by centrifugation, and washed three times with acetone. This crude lipid (18.5 g.) is then fractionated into major phospholipid classes by chromatography.

Silicic acid (75 g.) (Mallinckrodt, 100 mesh, chromatographic grade), activated by heating overnight at 110°, is suspended in chloroform-methanol (4:1) system and poured into a column. The flow rate is adjusted pholipid phosphorus applied to the column. The column is developed with the following solvents:

(1) Chloroform:methanol—4:1 vol. used 750 ml.
(2) Chloroform:methanol—3:2 vol. used 350 ml.
(3) Chloroform:methanol—1:4 vol. used 350 ml.

The eluate obtained with solvent (1) contains all inhibitor activity and is evaporated to dryness under reduced pressure in a nitrogen atmosphere (yield 0.412 g.). This fraction contained phosphatidyl serine, phosphatidyl ethanolamine, and possibly neutral lipid in addition to the inhibitor and these are separated by chromatography on another silicic acid column.

This column, prepared as described before from 69 g. silicic acid, is 3 x 40 cm. The sample (412 mg.) is applied to the column in chloroform:methanol (6:1) and is developed with the following solvent systems:

(1) Chloroform:methanol—6:1 vol. used 550 ml.
(2) Ethyl acetate:methanol—3:2 vol. used 300 ml.

The loading factor is 0.5 mg. phospholipid phosphorus for each gram of silicic acid. Eluent from solvent system (2) is pooled and evaporated to dryness in a film evaporator under a nitrogen atmosphere (yield 63 mg.). If more than 300 ml. of eluting solvent (2) are used, phosphatidyl serine is eluted from the column. If phosphatidyl serine is present in the sample it is removed using a column prepared from 25 g. of silicic acid with chloroform-methanol (4:1) as described above. The finished column (1 x 20 cm.) is washed with 30 ml. of chloroform-methanol-ammonia prepared by adding 10 ml. of concentrated ammonium hydroxide to 1 liter of chloroform-methanol (4:1). The sample is applied to the column in chloroform-methanol (4:1) and the column is developed with the following solvent systems:

(1) Chloroform:methanol—4:1 vol. used 200 ml.
(2) Chloroform:methanol—3:2 vol. used 150 ml.
(3) Methanol—vol. used 100 ml.

The eluate from solvent system (1) contains the inhibitor and when 75 mg. of lipid are applied to the column, 42 mg. are recovered in this fraction.

The renin inhibitor obtained in the above manner is characterized by the infrared absorption spectrum of a film of the renin inhibitor on a sodium chloride crystal shown in FIG. 1.

Furthermore, the renin inhibitor of this invention is characterized by the following fatty acid composition, determined by gas-liquid chromatography and comparison with known samples:

FATTY ACID COMPOSITION OF RESIN INHIBITOR

| Chain length: Double bonds | Retention time of— | | Percent of total fatty acids in sample |
|---|---|---|---|
| | Standard (min.) | Sample (min.) | |
| $C_{16:0}$ | 5.8 | 5.8 | 17.7 |
| $C_{18:0}$ | 10.3 | 10.4 | 14.4 |
| $C_{18:1}$ | 12.2 | 12.2 | 12.4 |
| $C_{18:2}$ | 15.6 | 15.6 | 6.1 |
| $C_{20:4}$ | 37.3 | 37.8 | 37.9 |
| Unidentified (5 minor peaks) | | | 11.5 |

We claim:
1. A renin inhibitor of the formula

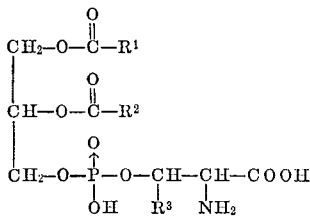

in which $R^1$ and $R^2$ are selected from the group consisting of hydrocarbon radicals of fatty acids containing from 16–20 carbon atoms and from 0–4 double bonds, and $R^3$ is selected from the group consisting of hydrocarbon radicals containing from 4–10 carbon atoms.

2. A renin inhibitor characterized by the infrared absorption spectrum of a film thereof on a sodium chloride crystal shown in FIG. 1.

3. A renin inhibitor characterized by possessing the chemical structure

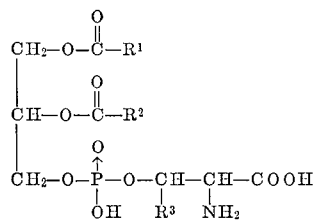

in which $R^1$ and $R^2$ are selected from the group consisting of hydrocarbon radicals of fatty acids containing from 16–20 carbon atoms and from 0–4 double bonds, and $R^3$ is selected from the group consisting of hydrocarbon radicals containing from 4–10 carbon atoms, and which is furthermore characterized by possessing the following fatty acid compositions:

$C_{16}$ (saturated): 17.7%
$C_{18}$ (one double bond): 12.4%
$C_{20}$ (four double bonds): 37.9%
$C_{18}$ (saturated): 14.4%
$C_{18}$ (two double bonds): 6.1%
Unidentified: 11.5%.

4. The process for preparing a renin inhibitor comprising:
(a) extracting mammalian kidney tissue with acetone, and evaporating said acetone extract under reduced pressure to dryness;
(b) redissolving the dry product obtained from said acetone extract in chloroform-methanol 2:1, filtering, evaporating the filtrate to dryness under reduced pressure, redissolving in chloroform-methanol 2:1, washing with water, and evaporating the organic phase to dryness under reduced pressure;
(c) redissolving said residue from the evaporation of the organic phase in petroleum ether, adding ten volumes of acetone, keeping at —20 to —30° C. for 24 hours, centrifuging, and washing the precipitate with acetone;
(d) redissolving said precipitate in chloroform-methanol 4:1, chromatographing on silicic acid, eluting with chloroform-methanol 4:1, and evaporating the eluates to dryness under nitrogen and under reduced pressure;
(e) redissolving the residue obtained in the preceding step in chloroform-methanol 6:1, and chromatographing on silicic acid, eluting first with chloroform-methanol 6:1 to remove inactive material and then eluting with ethyl acetate-methanol 3:2, to obtain the renin inhibitor by evaporation under reduced pressure of said ethyl acetate-methanol eluates.

References Cited

UNITED STATES PATENTS 3,197,371   7/1965   Dailey et al. _____ 167—65

ELBERT L. ROBERTS, Primary Examiner